United States Patent Office 3,778,481
Patented Dec. 11, 1973

3,778,481
PROCESS FOR THE PRODUCTION OF ALKYL DIHYDROXY BENZENES
Efim Biller, Fribourg, Switzerland, Roman Goller, Vienna, Austria, Hellmuth Pflugk, Wesseling, Germany, and Richard Schlegel, Vienna, Austria, assignors to Union Rheinische Braunkohlen Kraftstoff Aktiengesellschaft, Wesseling, near Cologne, Germany
No Drawing. Filed Feb. 13, 1970, Ser. No. 11,342
Claims priority, application Germany, Feb. 17, 1969, P 19 07 879.6
Int. Cl. C07c 37/02
U.S. Cl. 260—629  4 Claims

ABSTRACT OF THE DISCLOSURE

Production of alkyl dihydroxy benzenes by reacting an alkyl chloro phenol with caustic potash in suspension in an inert solvent at elevated temperatures, whereby the water formed during the reaction is removed, wholly or in part.

BACKGROUND OF INVENTION

This invention relates to a process for the production of alkyl dihydroxy benzenes. Conventional processes for the production of alkyl dihydroxy benzenes are relatively complicated, and hence do not lend themselves to working on an industrial scale. For example, it has been proposed to obtain 1-methyl-3,5-dihydroxybenzene (orcinol) by fusing 3,5-dibromotoluene or 5-chlorotoluene sulphonic acid in potash. The desired products can also be obtained, for example, by splitting off the carboxyl group from a corresponding alkyl dihydroxy benzoic acid. As can be seen, the starting materials for the proposed syntheses are themselves difficult to obtain, so that hitherto alkyl dihydroxy benzenes have only been produced on a limited scale.

SUMMARY OF INVENTION

The present invention provides a process for the production of an alkyl dihydroxy benzene which comprises reacting an alkyl halogeno phenol with caustic potash in suspension in a solvent at a temperature of from 140 to 250°° C., water eliminated during the reaction being removed, wholly or in part, from the reaction vessel.

DETAILED DESCRIPTION

The reaction is accompanied by extensive isomerisation into the m-position, which enables particularly desirable products, such as 1-methyl-3,5-dihydroxy benzene (orcinol) or 1-methyl-2,4-dihydroxy benzene (cresorcinol), in addition to pyrocatechol or hydroquinone derivatives, to be obtained from inexpensive starting materials. It is possible, for example, to obtain orcinol from 4-chloro-m-cresol, which is widely employed as a bactericide and fungicide.

No difficulties are encountered in dissipating the heat of reaction. By using a suitable solvent, or by carrying out reaction at the boiling temperature of the solvent, which can be adjusted by adjustment of the pressure, it is possible to keep the reaction temperature at any desired exact level. Suitable solvents include hydrocarbons or hydrocarbon mixtures, for example diethyl benzenes, triisopropyl benzene, cumene, pseudo-cumene, xylenes and tetradecane, or other inert solvents, such as diphenyl ethers. The reaction is best carried out at a temperature of from 140 to 250° C. and more particularly at a temperature of from 165 to 220° C. In general, the reaction is carried out with the theoretical quantity of caustic potash, although the ratio may of course be varied within certain limits. The water of reaction can be removed by azeotropic distillation with some of the solvent. It is also possible to bind chemically all or some of the water of reaction, for example by the addition of lime, or to remove it by flushing with an inert gas.

It is also of advantage vigorously to stir the suspension during the reaction. The process may be carried out continuously or batchwise.

The process according to the invention affords several considerable advantages over the conventional production of dihydroxy benzenes in alkaline melts. The excess of alkali otherwise necessary primarily to maintain stirrability, can be reduced to the theoretical quantity of alkali. The amount of resin formed is limited and the yield of desired end products is higher than in conventional processes

Example

In each of the following experiments A–E 600 ml. samples of triisopropyl benzene were introduced into a reaction vessel equipped with stirring mechanism, thermometer, reflux condenser, water separator and vacuum attachment. 1.8 to 1.98 mols of caustic potash and 0.6 mol of each of the alkyl halogeno phenols mentioned in the individual examples below were then introduced with vigorous stirring, the mixture was heated and the pressure was regulated in such a way that the required temperature prevailed. During the reaction, the water of reaction entrained by the boiling triisopropyl benzene was collected in the water separation. After cooling, approximately 350 ml. of water were introduced into the reaction vessel with gentle stirring. After the stirring mechanism had been switched off, the aqueous alkaline phase was separated off from the organic layer, acidified with sulphuric acid and extracted with ether and the crude product obtained was worked up by distillation.

(A) Reaction of 4-chloro-m-cresol at 180° C., reaction time: 3.5 hours. Alkyl dihydroxy benzenes are obtained in a yield of 85% of the theoretical (136 g.). Composition of the crude product:

7% by weight of unreacted 4-chloro-m-cresol
73% by weight of orcinol
12% by weight of toluhydroquinone
8% by weight of relatively high-boiling residue (B) Reaction of 6-chloro-m-cresol at 170° C., reaction time: 4 hours. Yield 82%. Composition of the crude product:

4% by weight of unreacted 6-chloro-m-cresol
26% by weigh tof homopyrocatechol
59% by weight of orcinol
11% by weight of residue (C) Reaction of 6-chloro-m-cresol at 180° C., reaction time: 3 hours. Yield 73%. Composition of the crude product:

3% by weight of unreacted 6-chloro-m-cresol
26% by weight of homopyrocatechol
52% by weight of orcinol
19% by weight of residue (D) Reaction of 2-chloro-p-cresol at 175° C., reaction time: 2.5 hours. Yield 79%. Composition of the crude product:

9% by weight of unreacted 2-chloro-p-cresol
35% by weigh of homopyrocatechol
44% by weight of cresorcinol
12% by weight of residue (E) Reaction of 6-chloro-2,4-dimethylphenol at 175° C., reaction time: 3 hours. Yield 79%. Composition of the crude product:

5% by weight of unreacted 6-chloro-2,4-dimethylphenol
38% by weight of 2,4-dimethylpyrocatechol
43% by weight of 2,4-dimethyl resorcinol
14% by weight of residue

What we claim is:

1. A process for the production of a phenol selected from the group consisting of orcinol and cresorcinol which comprises reacting 4-chloro-m-cresol, 6-chloro-m-cresol or 2-chloro-m-cresol with caustic potash at a temperature of from 140° to 250° C. in suspension in an inert solvent consisting of a hydrocarbon, a hydrocarbon mixture or diphenyl ether and removing during the course of the reaction at least part of the water formed in said reaction.

2. The process of claim 1 wherein the phenol product is recovered by cooling the reaction mixture, adding water, separating the resulting aqueous alkaline layer from the organic layer, acidifying the aqueous alkaline layer and extracting the phenol product therefrom with ether.

3. A process as claimed in claim 1 wherein the solvent is diethyl benzene, triisopropyl benzene, cumene, pseudocumene, or xylene.

4. A process as claimed in claim 1 wherein the solvent is tetradecane.

References Cited
UNITED STATES PATENTS

| | | | |
|---|---|---|---|
| 2,111,973 | 3/1938 | Kokatnur | 260—629 X |
| 2,509,245 | 5/1950 | Nikawitz et al. | 260—629 X |
| 2,799,713 | 7/1957 | Widiger et al. | 260—629 X |
| 2,799,714 | 7/1957 | Widiger et al. | 260—621 E X |
| 1,737,842 | 12/1929 | Hale et al. | 260—621 R |
| 3,213,146 | 10/1965 | Prahl et al. | 260—621 R X |

LEON ZITVER, Primary Examiner

N. MORGENSTERN, Assistant Examiner

U.S. Cl. X.R.

260—620